…

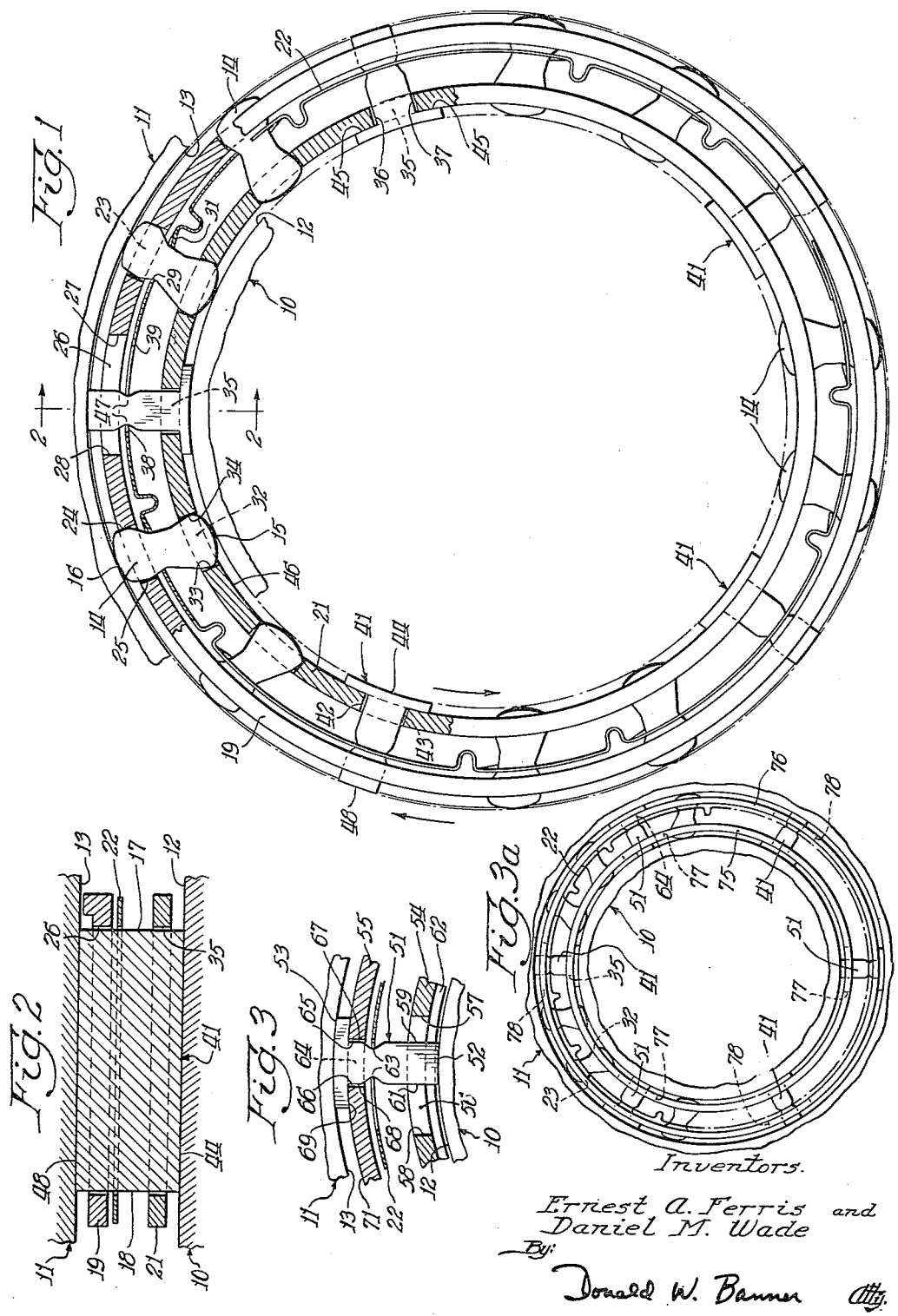

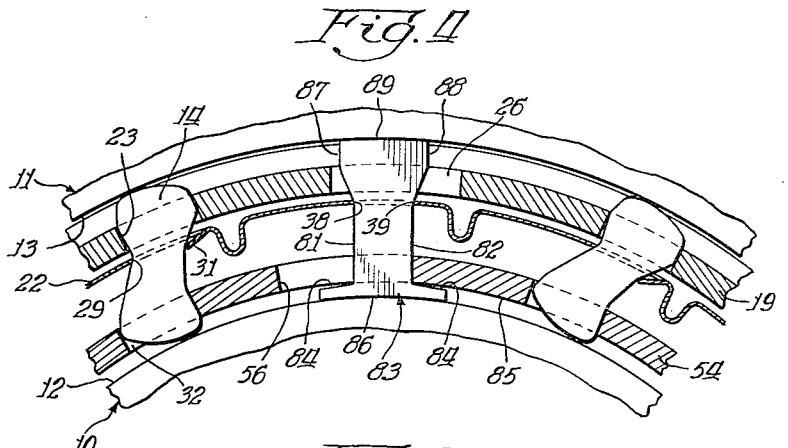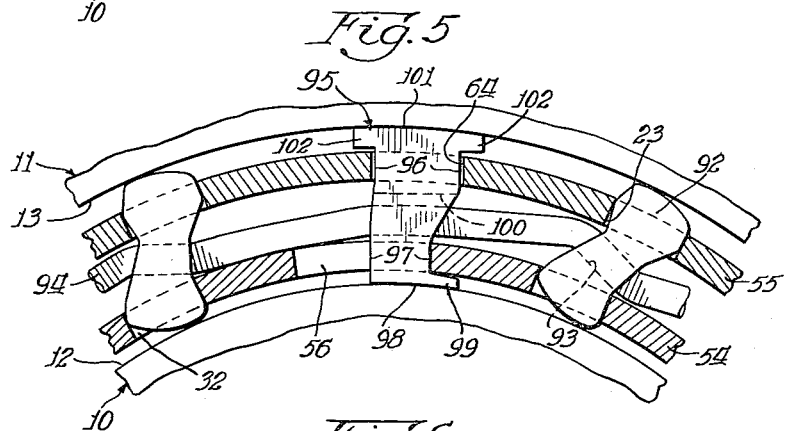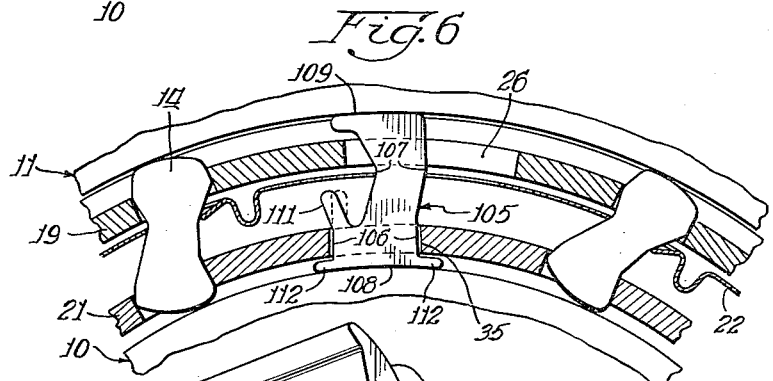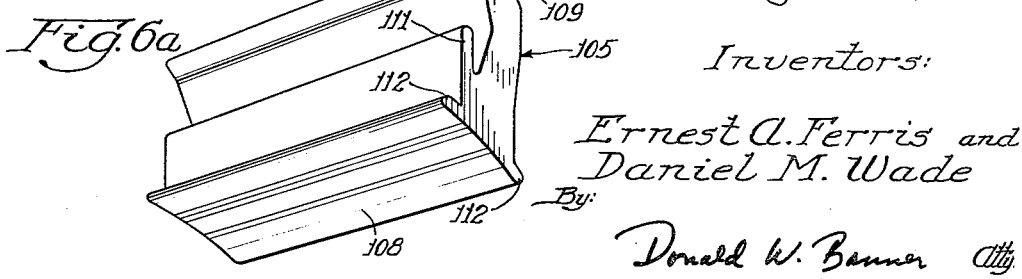

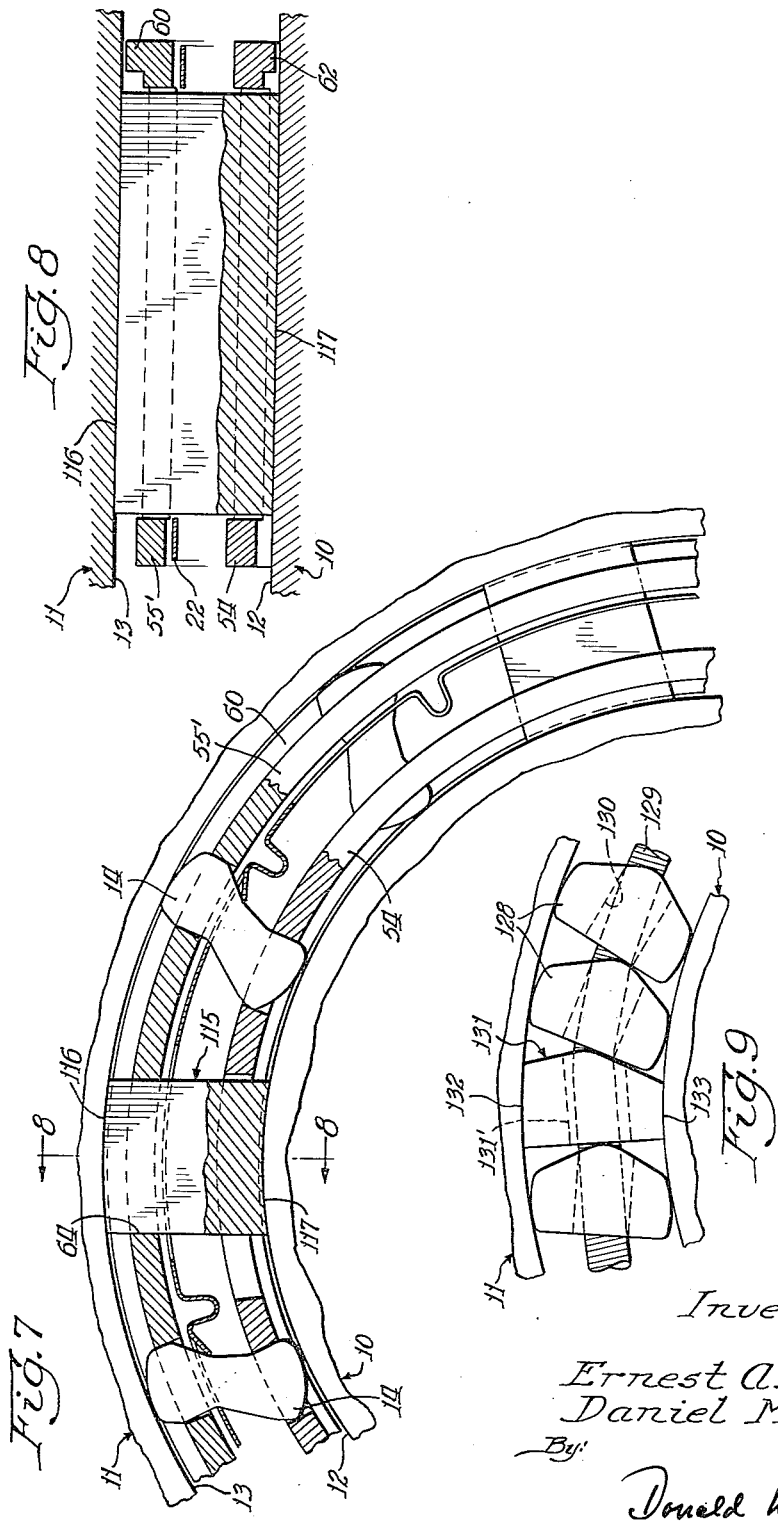

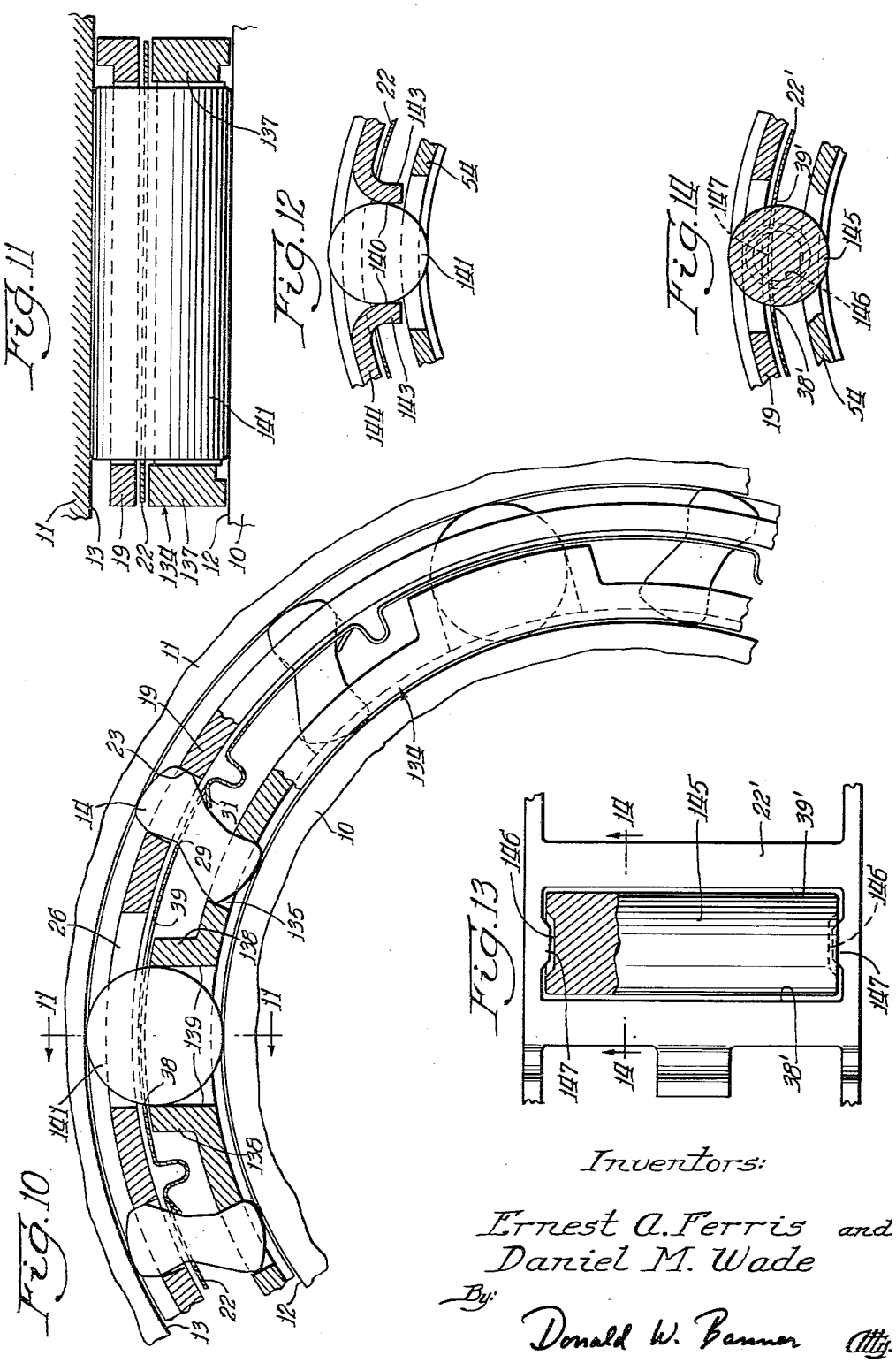

United States Patent Office 3,049,205
Patented Aug. 14, 1962

3,049,205
ONE-WAY CLUTCH AND BEARING
Ernest A. Ferris, Elmhurst, and Daniel M. Wade, River Forest, Ill., assignors to Borg-Warner Corporation, Chicago, Ill., a corporation of Illinois
Filed June 21, 1954, Ser. No. 438,056
2 Claims. (Cl. 192—45.1)

The present invention relates, in general, to one-way engaging devices, and more particularly, to combined one-way clutches and bearings.

One-way clutches of the sprag type are well known to the art, and comprise sprags adapted to wedgingly engage between a pair of radially spaced, races upon tilting of the sprags in one direction for connecting the races together in torque transmitting relation, and to disconnect the races upon tilting of the sprags in the opposite direction. The races themselves are each provided with a cylindrical surface for engagement by the sprags, the cylindrical surface on one race being arranged so as to be concentric with, and radially spaced from, the cylindrical surface on the other race. Bearings are frequently provided which engage these spaced surfaces to maintain the desired radial distance therebetween and to maintain the races in concentricity. In some prior installations, the bearings have been separate annular members mounted at either side of a sprag-cage assembly; similarly, prior devices are known which employed a part integral with one of the races as the bearing member; still other prior devices employ a cage, enclosing the sprags, as a bearing. All of these, and other types of, prior structures were subject to various undesirable features, the most prominent of which were the excessive size of the unit, the relatively high cost—both in the manufacture of the various parts, and in their assembly—and the failure of the combined sprag-bearing assembly to operate as satisfactorily as desired, particularly under adverse working conditions such as torsional vibration, shock loading, and low temperature operation.

It is, therefore, one object of the present invention to provide a combined sprag type one-way clutch and bearing which will overcome the difficulties presented by the prior art structures.

A further object of the present invention is the provision of a one-way sprag clutch in which the spacing means comprise slipper blocks having inner and outer spaced surfaces which are respectively complementary to, and engage, the spaced surfaces of the races to maintain the desired radial distance therebetween.

Another object is the provision of a one-way engaging device comprising a plurality of sprags or wedging devices and a pair of radially spaced, relative movable cages, unitary bearing elements being provided which are spaced peripherally and which respectively extend through suitable apertures in both cages to engage and suitably space the pair of radially spaced race surfaces.

Another object is the provision of a device in accordance with the preceding object in which the bearing elements are plain bearings having smooth surfaces at either end curved to conform to the curvature of the surfaces of the races to be engaged thereby.

Another object is the provision of a device in accordance with the preceding object in which the smooth surfaces have substantial areas which contact the associated races.

A further object is the provision of a device in accordance with the preceding objects in which the slipper blocks are unitary elements, not integral with any cages, but which may be assembled into a one-way clutch by insertion into apertures formed in cages.

Another object is the provision of a device in accordance with the preceding objects in which the unitary slipper blocks are of a good bearing material, such as bronze, while the races and cage are of harder metal— such as steel.

Another object is the provision of a one-way sprag clutch having a pair of rigid, relatively rotatable and radially spaced cages disposed between the spaced surfaces of the races and in which bearing means—preferably slipper blocks—extend through suitable apertures in the cages to engage the spaced race surfaces, maintaining the desired radial distance therebetween.

Another object is the provision of a one-way sprag clutch in accordance with the preceding object in which the spacer blocks aid in centering the cages with respect to the races.

Another object is the provision of a combined clutch and bearing in which means are provided to maintain accurately the spacing between facing, radially spaced race surfaces, and in which means are provided to ensure that the sprags engage the races simultaneously and maintain their relative positions throughout the working range of the clutch, each of the sprags simultaneously duplicating the angular movement of the other sprags throughout the normal sprag tilting range.

Another object is the provision of a device in accordance with the preceding object in which cage members are provided which maintain the phasing relationship between the sprags.

Another object is the provision of a device in accordance with the preceding object in which the means which maintain the spacing between the races are further constructed and arranged to maintain also the cages centrally disposed with respect to the races.

Another object is the provision of a bearing member having spaced surfaces curved about a common center external of the bearing member which spaces facing surfaces of a pair of races and which has a circumferential extent which is only a small fraction of the circumferential extent of the race surfaces.

Other objects and features will be readily apparent to those skilled in the art from the specification and drawings illustrating certain preferred embodiments in which:

FIGURE 1 is an elevational view of a first form of a one-way clutch embodying the principles of the present invention, in which certain parts are broken away to facilitate the description thereof;

FIGURE 2 is a sectional view along the plane of line 2—2 of FIGURE 1;

FIGURE 3 is a fragmentary view of a clutch similar to that of FIGURE 1 in which is shown a slipper block similar to that shown in FIGURE 1, but reversed end for end and guided by the outer cage;

FIGURE 3a is a fragmentary, sectional view of a clutch combining features of the clutches shown in FIGURES 1 and 3;

FIGURE 4 is a fragmentary, sectional view illustrating another form of a one-way clutch incorporating the principles of the present invention;

FIGURE 5 is a fragmentary, sectional view of a further form of a one-way clutch incorporating the principles of the present invention;

FIGURE 6 is a fragmentary, sectional view of a further form of a one-way clutch incorporating the principles of the present invention;

FIGURE 6a is an enlarged perspective view of a plain bearing of the type shown in FIGURE 6 and in accordance with the present invention;

FIGURE 7 is a fragmentary view partially in section illustrating another form of a one-way clutch incorporating the principles of the present invention;

FIGURE 8 is a sectional view along the plane of line 8—8 of FIGURE 7;

FIGURE 9 is a fragmentary view of another form of clutch embodying the present invention;

FIGURE 10 is a partial elevational view of a modified form of combined full phasing one-way clutch and bearing in which portions have been broken away to facilitate the showing;

FIGURE 11 is a sectional view along the plane of line 11—11 of FIGURE 10;

FIGURE 12 is a partial sectional view of a modification of the structure illustrated in FIGURE 10;

FIGURE 13 is a partial plan view of another modification of the clutch illustrated in FIGURE 10;

FIGURE 14 is a sectional view along the plane of line 14—14 of FIGURE 13.

In the drawings, like reference numerals in the different views identify substantially identical parts.

Referring to the combined one-way sprag clutch and bearing disclosed in FIGURES 1 and 2 there is shown therein a pair of inner and outer races 10 and 11 having, respectively, concentric and cylindrical facing surfaces 12 and 13. A plurality of sprags or grippers 14 are disposed in peripherally spaced relation between the races 10 and 11, each of the sprags preferably having a pair of eccentric wedging surfaces 15 and 16 respectively engaging the surfaces 12 and 13 of the races 10 and 11. Each of the sprags 14 is further preferably provided with flat, parallel, axially spaced side surfaces 17 and 18. For a more particular description of the particular sprag disclosed herein, reference should be made to the copending application of Harry P. Troendly et al., Serial No. 379,534, entitled "One-Way Clutch" and filed September 11, 1953, now Patent No. 2,824,636, granted February 25, 1958, in which FIGURES 1 through 5 of that application disclose the sprag form comparable to the sprag 14.

A pair of inner and outer, relatively rigid, and relatively rotatable cages designated respectively by reference numerals 19 and 21 are provided, and interposed concentrically between these cages is a flexible spring ribbon energizing cage 22 which is operative to bias the sprags in a counterclockwise direction—from the view of FIGURE 1—into engagement with the surfaces 12 and 13 of the races 10 and 11. The outer cage 19 is provided with a plurality of uniform, circumferentially spaced, radially extending rectangular sprag receiving openings or windows 23 each defined in part by a pair of parallel, circumferentially facing surfaces 24 and 25. The surfaces 24 and 25 are each parallel to a plane drawn through the center of rotation of the races and bisecting the space between the surfaces 24 and 25. The cage 19 is also provided with a plurality of uniform, circumferentially spaced, radially extending, rectangular bearing or slipper block receiving openings or windows 26. Each of the openings 26 is defined in part by a pair of opposed, circumferentially facing surfaces 27 and 28 which are relatively widely spaced. As shown in FIGURE 1, the cage 19 is provided with one-half as many bearing receiving windows 26 as with sprag receiving windows 23, so that between each of an adjacent pair of bearing receiving openings 26 there are two sprag receiving openings 23; it should be understood, however, that this particular arrangement is merely illustrative. In addition, the cage 19 is provided with an annular, radially extending reinforcing and centralizing flange 20.

The resilient or flexible ribbon energizing cage 22 is of the general type described and claimed in the copending application of Troendly et al., Serial No. 263,064, filed December 24, 1951, now Patent No. 2,824,635, granted February 25, 1958, and entitled "One-Way Engaging Device"; for a more thorough understanding of this cage 22 reference should be made to that copending application. It will suffice in the present application to say that the cage 22 is formed of flexible, spring-like material with a plurality of peripherally spaced, sprag receiving openings each defined on one side by a fulcrum edge 29, and on the opposite side by a flexible energizing tab 31 which extends into the associated sprag receiving opening. The tabs 31 function respectively to urge the sprag engaged thereby against the opposed fulcrum edge 29 and effect substantially perfect axial alignment thereof, as well as functioning constantly and continuously to exert an individual force on each individual sprag tending to move the associated sprag about the fulcrum 29 toward wedging engagement with the races. The ribbon 22 is further provided with a plurality of substantially rectangular, bearing receiving openings each defined on one side by an edge 28 (comparable to the edge 29 of the sprag receiving opening in the ribbon 22) and on the opposite side by a parallel edge 39.

The inner cage 21 is provided with a plurality of rectangular, peripherally spaced sprag receiving openings or windows 32 which are each defined in part by a pair of circumferentially spaced surfaces 33 and 34. The surfaces 33 and 34, like the surfaces 24 and 25, are each parallel to a plane drawn through the center of rotation of the races bisecting the space between the surfaces 33 and 34. Cage 21 is also provided with a plurality of uniform, circumferentially spaced, rectangular bearing or slipper block receiving openings or windows 35, each of which is defined in part by a pair of opposed, circumferentially facing surfaces 36 and 37. Although in FIGURE 1 between each of an adjacent pair of bearing receiving openings 35 there are shown two sprag receiving openings 32, it should be understood that this particular arrangement is merely illustrative.

For a more thorough understanding of the construction and arrangement of the inner and outer rigid cages 21 and 19, respectively, the ribbon cage 22, the sprags 14 and the interaction between these members, reference should be had to the aforementioned copending application No. 379,534. Suffice it herein to say that the illustrated configurations of the sprags 14, the cages 19 and 21, and the cage 22 is of such nature that the effective peripheral dimensions of those portions of the sprags 14 disposed within the openings 23 and 32 in the rigid cages 19 and 21, respectively, remain substantially constant, irrespective of the angle of tilt of the sprags in their normal operating range, and there is a continuous phasing bearing relation of the sprags with the surfaces 24, 25, 33 and 34 in the rigid cages regardless of the normal degree of tilt of the sprags. The clearance between the sides of the openings 23 and 32, and the portions of the sprags 14 disposed therein, is only a bearing clearance, regardless of the position of tilt of the sprags within their normal operating range; therefore, all of the sprags 14 will be compelled to operate substantially in unison angularly with each other so that they each occupy substantially the same position and arrangement with the races under all conditions of normal operation. In other words, all of the sprags are forced to stay in phase with each other, within the limits provided by normal manufacturing procedure. The structure illustrated is, therefore, a full phasing sprag clutch, one in which all of the sprags operate substantially in unison angularly with each other throughout their normal tilting range.

Disposed within each of the openings 35 of the cage 21 is a plain bearing or slipper block 41, preferably of a material such as bronze, having sides 42 and 43 extending radially over a portion thereof; the dimension of blocks 41 between sides 42 and 43 is such that these sides are slightly spaced from the surfaces 36 and 37 defining the openings 35. The radially innermost surfaces of the blocks 41, designated by the numeral 44 are constructed, as shown in FIGURES 1 and 2, so as to be complementary with the surface 12, having substantially the same radius of curvature as that surface 12, and so as to present a substantial area of engagement therewith. The surfaces 44 are, in addition, completely smooth. The block 41 is further provided with ledge portions 45, the radially outwardly facing portions of which are engaged by the radially inwardly facing surface 46 of the cage 21. It will be noted that the uniform spacing of the blocks 41 about the inner race 10, and the engagement between the surface 46 and the ledge portions 45, is of such nature that the radial spacing between the cage 21 and the inner race 10 is maintained constant.

It will also be seen from FIGURE 1 that the radially centermost portions of the blocks 41—in alignment with the cage 22—are indented as at 47 and this indentation, together with the dimensions of the bearing receiving apertures in that cage, is such that clearance is provided between the blocks 41 and the cage 22. It will be obvious that the dimensions of those bearing receiving apertures could be such that clearance between cage 22 and blocks 41 would be obtained without indentations 47 in the blocks 41.

It should also be noted that each block 41 extends through the associated window 26 in the outer cage 19, that portion of each block 41 which is disposed within the window 26 substantially more narrow than the spacing between the sides 27 and 28 of the windows 26 so that cage 19 may rotate with respect to cage 21. The radially outward surface 48 of the blocks 41 is constructed with a radius of curvature which is substantially the same as that of the surface 13 of the race 11 so that the surface 48 is complementary thereto, and each surface 48 is such that a substantial area of surface contact between each surface 48 and the race 11 is provided. The surfaces 48, like the surface 44, are finished so as to be completely smooth. (While the races and the rigid cages are preferably of a hard metal, such as steel, the blocks 41 are preferably formed of a softer material, such as bronze.) The equidistant peripheral spacing of blocks 41, and the radial spacing between the surfaces 44 and 48 of the blocks 41, are of such nature that the desired radial spacing between the surfaces 12 and 13 of the races 10 and 11 is maintained during overrunning of the races.

In assembling the structure illustrated in FIGURE 1, the sprags 14 are initially assembled into the sprag receiving openings in the flexible ribbon cage 22. This sub-assembly is then assembled with the outer rigid cage 19, the radially outward portions of the sprags 14 being fitted into the sprag receiving windows 19; subsequently, the radially innermost portions of the sprags 14 are assembled into the sprag receiving openings 32 in the inner cage 21. The plain bearings, or slipper blocks, 41 are then assembled into the structure by insertion through the slipper block receiving openings or windows 35 in the inner cage 21. As indicated in FIGURE 1, the blocks 41 are inserted into the openings 35 until the ledges 45 thereof engage the undersurface 46 of the cage 21, the space between the surfaces 44 and the radially outward facing portions of the ledge 45 being the desired spacing between the race 10 and the cage 21. When the surface 46 of the cage 21 and the outwardly facing portions of the ledges 45 are in engagement, the assembly is then inserted between the races 10 and 11, the radial distance between the surfaces 44 and 48 of the block 41 being exactly the desired radial spacing between the races 10 and 11. Inasmuch as the blocks 41 are equally spaced about the circumferentially extending opening between the races 10 and 11, the desired radial spacing between the races is maintained, and the races 10 and 11 are kept concentric.

In the operation of the one-way clutch disclosed in FIGURE 1, when the races 10 and 11 have the relative direction of rotation shown by the arrows, the sprags 14 assume the illustrated position and the races overrun. When, however, the relative direction of rotation of the races 10 and 11 is opposite to that illustrated by the arrows in FIGURE 1, the sprags 14 will be moved to their engaged position in which the races 10 and 11 will be interconnected by the sprags and rotate together in unison. As the sprags 14 tilt from engaged to disengaged position and vice versa, the cages 19, 21 and 22 experience relative rotative movement. It is important to note that the movement of cages 19 and 22 with respect to the cage 21 is not impeded by the blocks 41; as previously indicated these blocks 41 are indented at 47, and the bearing receiving apertures in cage 22 are dimensioned so that cage 22 is clear of blocks 41 as that cage rotates with respect to the cage 21, and furthermore, the portion of the blocks 41 disposed within the windows 26 is very narrow with respect to the spacing between the edges 27 and 28 which define the window 26 so that the cage 19 may proceed through its normal range of movement with respect to the cage 21 without striking, or in any way being impeded by, the block 41. A fuller description of the operation of this full phasing clutch is made in the aforementioned copending application of Troendly, Serial No. 379,534, which should be consulted for a more thorough understanding.

In FIGURE 3, there is illustrated an alternative construction of a one-way clutch employing slipper blocks for spacing races 10 and 11. As illustrated in that figure, there are disposed between the surfaces 12 and 13 of the races 10 and 11 a plurality of peripherally spaced slipper blocks 51. These slipper blocks 51 have, respectively, radially inward surfaces 52 with the radius of curvature of the surface 12 of the race 10, the surfaces 52 engaging the surface 12. Blocks 51 also have radially outward surfaces 53 which have the radius of curvature of surface 13 of the race 11, the surfaces 53 engaging the surface 13. The surfaces 52 and 53 of the blocks 51 are perfectly smooth and, further, are so constructed as to present substantial areas of contact between the block 51 and both the races 10 and 11 respectively. The distance between the surfaces 52 and 53 of the block 51 is exactly the same as the desired radial spacing between the races 10 and 11 so that these races are maintained properly spaced, and concentric, by virtue of the blocks 51. Furthermore, while the races 10 and 11 are made of hard material, such as steel, the slipper blocks 51 are of good bearing material, such as bronze. Also disposed between the surfaces 12 and 13 are inner and outer rigid cages 54 and 55, respectively. The inner cage 54 is provided with a plurality of rectangular, circumferentially spaced, block receiving windows 56 each defined in part by edges 57 and 58. The cage 54 is further provided with a plurality of circumferentially spaced sprag receiving windows, comparable to the windows 32 in the cage 21 of FIGURE 1. Each block 51 is provided over a portion of its length with sides 59 and 61, which extend through the corresponding window 56, and it should be noted that the spacing between the sides 59 and 61 of the block 51 is substantially less than the spacing between the edges 57 and 58 so that the cage 54 may move relative to the outer cage 55 without engaging the block 51. The cage 54 is provided with an annular, radial extending flange 62 for cooperating with the inner race 10 to maintain the cage 54 positioned properly relative thereto. The block 51 is further provided with indented portions, as at 53, so as to be clear of the edges 38 and 39 of the flexible ribbon cage 22 as that cage moves relative to the outer cage 55.

The outer cage 55 is provided with a plurality of equidistantly spaced, rectangular block receiving openings 64, each defined in part by opposed sides 65 and 66. These sides are slightly spaced from sides 67 and 68 of the block 51. The block 51 is further provided with ledges 69 which engage, and which are complementary in curvature to, the radial outwardmost surface 71 of the cage 55, and it is obvious that the spacing between the race 11 and the cage 55 is maintained thereby as desired. It will further be obvious, that although not shown, the cages 22 and 55 are also provided with sprag receiving windows or openings comparable to those illustrated in the flexible ribbon cage and the outer cage of FIGURE 1, and that sprags are inserted into the sprag receiving windows in the inner and outer—and flexible ribbon— cages in exactly the same manner as shown in FIGURE 1. The device illustrated in FIGURE 3 operates in, and is assembled in, substantially the same manner as previously described in FIGURE 1, the blocks 51 being equidistantly spaced about the circumferential opening between the races 10 and 11 to maintain these races spaced as desired and held in concentricity. It should further be noted that with the blocks 51 guided by the outer cage—as distinguished from the guiding of the slipper blocks by the inner cage as in FIGURE 1—in cases in which the outer race is overrunning, the effect of centrifugal force on the slipper blocks does not in any way prevent or impede the sprags from disengaging, as they normally do to reduce the free wheel wear.

In FIGURE 3a there is illustrated a clutch which combines certain of the features in the clutches illustrated in FIGURES 1 and 3. In FIGURE 3a there is disclosed inner and outer races 10 and 11 interconnected, only when rotating relatively in one direction, by structure which comprises sprags 14, energizing cage 22, and outer and inner rigid cages 76 and 75, respectively, having suitable openings 23 and 32 for receiving the sprags 14. The inner cage 75 is provided with a plurality of rectangular, equally circumferentially spaced, slipper block receiving openings 35 and is further provided with a plurality of circumferentially spaced, large slipper block receiving openings 77. The outer cage 76 is provided with a plurality of rectangular, equally circumferentially spaced block receiving openings 64, and is also provided with a plurality of circumferentially spaced, large slipper block openings 78. Mounted so as to be guided by the sides of the slipper block receiving openings 64 in the outer cage 76 are the slipper blocks 51 comparable to, and positioned as, those in FIGURE 3. Mounted so as to be guided by the sides of the block receiving openings 35 in cage 75 are slipper blocks 41 comparable to, and positioned as, those in FIGURE 1. It should be noted that the openings 78 in the cage 76 are so dimensioned that the edge defining means thereof are substantially spaced from the sides of the blocks 41, and the openings 77, similarly, are clear of the blocks 51. It will be seen that with a device of the type illustrated in FIGURE 3a, in which the slipper blocks 41 and 51 are alternatingly disposed about the circumference of the clutch, flanges are unnecessary on either of the cages 75 or 76 inasmuch as they are positioned with respect to the most adjacent race by virtue of the ledges 45 and 69 on the blocks 41 and 51, respectively, as previously discussed in connection with FIGURES 1 and 3. The clutch illustrated in FIGURE 3a will operate otherwise in substantially the same manner as those illustrated in FIGURES 1 and 3 throughout the normal range of operation of the unit.

Turning now to a consideration of FIGURE 4, there is shown a pair of races 10 and 11 having concentric, cylindrical, facing surfaces 12 and 13 respectively engaged by sprags 14 to effect, under conditions previously discussed, common movement of the races, the races being movable relative to each other when the sprags 14 are rotated or tilted to the position illustrated in FIGURE 4. Inner and outer cages 54 and 19, respectively, are provided, the cage 54 being provided with a plurality of circumferentially spaced sprag receiving windows or openings 32, and further provided with a plurality of circumferentially spaced slipper block receiving openings or windows 56. The outer rigid cage 19 is provided with a plurality of circumferentially spaced sprag receiving windows 23, and is further provided with a plurality of circumferentially spaced bearing receiving windows 26. Interposed between the cages 54 and 19 is a flexible, ribbon cage 22 having openings therein each defined in part by edges 29 and tabs 31 engaging the sprags 14, as previously described. In addition, the cage 22 is provided with a plurality of circumferentially spaced, bearing receiving openings defined in part by peripherally facing edges 38 and 39; disposed in each of these openings is a slipper block 83 having sides 81 and 82 guided by these edges 38 and 39. Engagement between the sides 81 and 82 and the edges 38 and 39 respectively, is relatively light. Consideration of FIGURE 4 will illustrate that the sides 81 and 82 of the block 83 extend through the block receiving openings 56 of the cage 54, the sides of the cage 54 which define the block receiving openings 56 being a substantial distance apart in comparison with the width of the block 83 between the sides 81 and 82. It will be obvious, therefore, that the cage 54 may rotate as the sprags 14 go through their normal range of tilting movement without engaging the block 83. It should be noted that the block 83 is provided with radially outwardly facing surfaces 84 which engage the underside 85 of the cage 54 to maintain it properly spaced from, and concentric with, the race 10. The radially inwardmost portion of the block 83 is a surface 86 which has the radius of curvature of, and which is in engagement with, the surface 12 of the race 10. The race engaging surface 86 is substantial in area and extremely smooth so that the friction between the block 83 and the inner race 10 is minimized. Radially outwardly from the ends of the sides 81 and 82 of blocks 83 is a widened portion of the block 83 defined by peripherally spaced surfaces 87 and 88, the widened portion of each block 83 passing through the associated block receiving window 26 in the cage 19. The radially outwardmost portion of the block 83 is a surface 89 defined in part by the surfaces 87 and 88. The surface 89 has the radius curvature of, and is in contact with, the surface 13 of the race 11. While presenting a substantial area of contact with surface 13, the surface 89 is machined or polished to the degree that little or no friction between the block 83 and the race 11 exists.

It is obvious that the block 83 has substantially wide portions at either end thereof which both present a substantial area of contact with the races associated with each end, so that an excellent bearing relationship is provided, the spacing between the surfaces 86 and 89 obviously being the desired spacing between the surfaces 12 and 13 of the races. In addition, as has been previously described and is common with all of these slipper blocks, the material from which the slipper block 83 is manufactured is preferably one which is softer than that of the races; for example, where the races and the cages are of steel, the slipper blocks may be of bronze or other comparable good bearing substance.

Turning to a consideration of FIGURE 5, there is shown a pair of coaxial races 10 and 11 having surfaces 12 and 13. Interposed between and adapted to engage the surfaces 12 and 13 are a plurality of sprags 92 peripherally spaced between the surfaces 12 and 13. To hold and control movement of the sprags 92 there is provided an outer cage 55 having a plurality of sprag receiving windows or openings 23, which are the same as the windows bearing the same number in FIGURE 1, through which portions of the sprags extend. Cage 55 is also provided with a plurality of peripherally spaced bearing windows 64. In addition, there is provided an inner cage 54 having a plurality of sprag receiving openings or windows 32 therein for engaging the radially inwardmost portion of the sprags 92 in a manner previously described. Cage 54 also is provided with bearing receiving windows 56, peripherally equidistantly spaced. The sprags 92 are substantially the same as the sprags 14 previously described, but differ in that they are provided with openings 93 therethrough which are substantially centrally disposed within the sprags 92, both radially and axially. Extending through the openings 92, and extending peripherally between the surfaces 12 and 13, is a garter spring 94 which, by engagement with the sides of the openings 93 in the sprags 92 serves to bias the sprags 92 towards engagement with the surfaces 12 and 13.

Extending through each associated pair of slipper block receiving windows 56 and 64 is a slipper block 95. Extending over a portion of the radial length of the block 95 is a portion thereof defined by the side walls 96, the dimension of the block 95 between the walls 96 being slightly smaller than the spacing between the edges defining the openings 64. Extending over a different portion of the block 95 is a section defined by the walls 97 thereof; as will be seen from FIGURE 5, the distance between the walls 97 is substantially less than the edges which define the circumferentially facing sides of the openings 56 so that the cage 54 may rotate relative to the cage 55 to permit the sprags 92 to move through their normal tilting range. The blocks 95 are each provided with a suitable aperture 100 through which the garter spring extends, the apertures 100 being so dimensioned that the spring 94 exerts no turning moment whatsoever on the blocks 95. The radially inwardmost portion of each block 95 is a surface 98 which is completely smooth, and which is complementary to and in engagement with the surface 12 of the race 10, and presents a substantial area of contact with that surface 12. It should be noted that the blocks 95 are each provided with an additional projection 99 in a manner so as to increase the effective area of the surface 98. The radially outwardmost portion of each of the blocks 95 is a surface 101 which is complementary to, and in engagement with, the surface 13 of the race 11. The effective area of the surface 101 is increased by virtue of portions 102 provided on the block 95 so that a substantial area of contact between the surface 101 and the surface 13 exists. The spacing between the surfaces 98 and 101 of the block 95 is, obviously, the desired radial spacing between the surfaces 12 and 13 of the races 10 and 11, respectively; furthermore, it should be noted that the cages 54 and 55 are centered by contact with the portions 99 and 102 of blocks 95. In addition, it should be noted that cage 55 may be split to facilitate assemblage of the elements.

Considering now FIGURE 6, there is shown a pair of spaced races 10 and 11 adapted to be interconnected, under certain conditions as previously described, by the sprags 14. Loosely disposed within each of the slipper block receiving windows 35 in cage 21 is a block 105, which has spaced sides 106 defining one portion thereof. As may be seen from FIGURE 6, the sides 106 are slightly spaced from the edges defining the openings 35. Each block 105 is further provided with a narrowed portion, defined by sides 107, suitably dimensioned so as to permit the necessary movement of the ribbon cage 22 relative to the inner cage 21 as the sprags 14 go through their normal tilting movement. The portion of each block 105 which projects through the associated block receiving window 26 in the cage 19 is, similarly, proportioned so that the cage 19 may rotate relative to the cage 21 as the sprags 14 tilt without being interrupted by the block 105. The radially spaced ends 108 and 109 of the block 105 are contoured so as to have the radii of curvature of the surfaces 12 and 13, respectively, which are engaged thereby, surfaces 108 and 109 being completely smooth and presenting substantial areas of contact to these surfaces. The block 105 is also provided with a finger 111 which, prior to assembly of the block 105 into the cages 19 and 21, assumes the dotted position illustrated in FIGURE 6. After insertion of the block 105 into position relative to the cages 19 and 21, the finger 111 is moved to the position illustrated in full lines in FIGURE 6 so that the block 105 is prevented from falling out of the assembly. It should be noted, in addition, that the block 105 is also provided with ledge portions 112 which also prevent the block 105 from falling out of assembly, and which also engage the radially inwardly facing surfaces of the cage 21 to space it as desired with respect to the inner race 10.

Attention is directed to FIGURE 6a showing an enlarged perspective view of the type of slipper block illustrated in FIGURE 6. It should be noted that the radially innermost surface 108 of each of the blocks 105 presents a substantial area for engagement with the inner race, the radially outwardmost portion 109 of the slipper blocks 105 also presenting a substantial area for engagement with the outer race. The other type of slipper blocks illustrated herein are similar to that of FIGURE 6a in that they all present substantially comparable areas of engagement with the radially spaced race surfaces.

In FIGURES 7 and 8 there is shown a different form of slipper block assembled with cages 55[1] (which differs from cage 55 only by having a centering flange 60), 22 and 54. The plurality of circumferentially spaced slipper blocks 115 shown therein may be lightly engaged by the sides which define the block receiving openings 64 so that the blocks 115 will not fall out of assembly with the cages, but these sides may also be slightly spaced from the blocks 115 if desired, so the blocks 115 are merely guided by those sides. The dimensions of the block 115 and the associated apertures in cages 22 and 54 are such, as illustrated in FIGURE 7, that the cages 22 and 54 may rotate relative to the cage 55[1] as the sprags 14 go through their tilting movement without the cages 22 and 54 engaging the blocks 115. Each of the plurality of blocks 115 has a radial outwardmost surface 116 which is in engagement with, and is contoured to have the radius of curvature of, the race surface 13. Similarly, the radially inwardmost surface 117 of each block 115 is contoured so as to have the radius of curvature of the surface 12 and have a substantial area of contact therewith. The surfaces 116 and 117 are perfectly smooth. Block 115 will thereby serve to maintain the desired space between the race surfaces 12 and 13.

While the clutches shown in FIGURES 1 through 8 are all of the "full phasing" type, which is more fully described and claimed in the aforementioned copending application of Harry P. Troendly et al., Serial No. 379,534, the present invention contemplates as well clutches of types other than the full phasing type incorporating the plaint type bearings of the present invention. For example, the plain type bearings may be employed with a non-full phasing type of one-way clutch of the nature illustrated in FIGURE 9. FIGURE 9 shows a one-way clutch of the general type illustrated in the patent to Gruenber et al., No. 2,477,176 issued July 26, 1949, in which a plurality of generally D-shaped sprags 128 are provided which are tiltable into one position in which the races 10 and 11 are interconnected and to another position in which the races are disconnected. A garter spring 129 is provided which extends through suitable channels 130 in the sprags 128 to effect a biasing force thereon. For a more detailed explanation of the construction and operation of a one-way clutch of this type the aforementioned Patent No. 2,477,176 should be consulted. In the structure shown in FIGURE 9, however, there has been provided a plurality of circumferentially spaced bearing blocks 131 each having an aperture 131[1] through which the garter spring 129 projects, the garter spring effecting no tilting moment whatsoever on the blocks 131. Each block 131 is provided with a surface 132 in engagement with the outer race 11, the surface of the race 132 being contoured to have the radius of curvature of the surface of the race 11 with which it engages. The opposite side of each block 131 is provided with a surface 133 in engagement with the adjacent portion of the inner race 10, the surface 133 being shaped to have the radius of curvature of the surface of the race 10 with which it is engaged. Both the surfaces 132 and 133 have substantial areas in contact with the races 11 and 10, respectively. Preferably a plurality of blocks of the type 131 are equidistantly disposed about the peripheral space between the races 10 and 11, and it should be noted that the peripheral dimension of the blocks 131 may be varied so that the number of sprags 128 may be correspondingly reduced or increased. In other words, the number of sprags in the clutch could be varied by varying the circumferential length of the blocks 131. It will be obvious that other non-full phasing clutches may utilize the slipper block bearings shown in FIGURES 1 through 9.

To summarize briefly the construction illustrated in the FIGURES 1 through 9, each of these discloses a one-way clutch incorporating a plurality of plain bearings or slipper blocks in which the radially spaced ends thereof are contoured to have generally the radius of curvature of the surface of the race with which those radially spaced ends cooperate. These ends on the blocks are very smoothly finished so as to cause substantially no friction drag, despite the fact that a substantial area of engagement between the blocks and the associated races exist. This is important to notice inasmuch as, by this construction, no slippage normally occurs as the clutch engages. It will, furthermore, be obvious to those skilled in the art that these bearings may be very economically manufactured and assembled, and the clutches incorporating these bearings or blocks are both economical and reliable. In this regard, it should be noted that these bearings or blocks may be aligned and equally spaced circumferentially between the races, so that the races are maintained properly concentric if so desired, or other dispositions thereof may be made. It is furthermore very important to note that the slipper blocks or bearings are discrete units, each preferably manufactured of a material which is suitable for bearing purposes such as bronze, brass or the like, so that the races—usually of steel—are not scuffed by these bearings or slipper blocks.

It should be noted that another aspect of the present invention is the provision of a full phasing clutch having discrete bearing means assembled therewith so as to function as a part thereof. This aspect of the invention has also been illustrated in FIGURES 1 through 8 where such bearing means are shown incorporated with a full phasing clutch. It should be noted that those figures illustrate the preferred embodiment, inasmuch as the bearing means disclosed therein are less expensive and more reliable than other types. As a further illustration, however, of this aspect of the invention, there is shown in FIGURES 10 through 14 other types of bearing means with a full phasing clutch of the general type illustrated in FIGURE 1. In FIGURES 10 and 11, there is disclosed a one-way clutch of the double cage, full phasing type which comprises the pair of races 10 and 11 providing axially extending, concentric, radially spaced surfaces 12 and 13 respectively. Disposed between the surfaces 12 and 13 is an outer cage 19 having a plurality of circumferentially spaced, rectangular sprag receiving windows 23 therein, through which extend the radially outward portions of the plurality of sprags 14. The cage 19 is further provided with a plurality of circumferentially spaced bearing receiving windows 26 at either side of a pair of adjacent sprag receiving windows 23. Disposed radially inwardly of the cage 19 is the flexible, ribobn cage 22 having a plurality of sprag receiving windows therein, each defined in part by circumferentially spaced, opposed edges 29 and tabs 31 which operate together constantly to maintain the sprags 14 in axial alignment and to bias the sprags toward engagement with the surfaces 12 and 13, as previously described. The ribbon cage 22 is also provided with a plurality of circumferentially spaced, rectangular bearing receiving windows defined in part by the radially spaced edges 38 and 39.

Also provided is an inner cage 134 having a plurality of circumferentially spaced, rectangular sprag receiving openings 135 therein which are comparable to the sprag receiving openings 32 of cage 21 illustrated in FIGURE 1. The radially inwardmost portions of the sprags 14 extend through the openings 135 as illustrated. The cage 134 has disposed therein a plurality of pocket defining means disposed between each successive pair of sprag receiving windows 135. These pocket defining means each comprise axially spaced side walls 137 integral with the cage 134 and axially extending, circumferentially spaced walls 138 having spaced, facing portions or surfaces 139. Disposed between each of the surfaces 139 is a roller 141 of a diameter less than that of the spacing between the surfaces 139. As shown in FIGURE 10, that diameter is the desired radial spacing between the surfaces 12 and 13 of the races 10 and 11, respectively. The roller 141 has line contact with both the surfaces 12 and 13, and it should be noted that the clearances provided by the bearing receiving openings in the cages 19 and 22 are of such nature that those cages may rotate relative to the inner cage 134, as the sprags 14 go through their normal tilting range, without the cages 19 and 22 engaging the rollers 141.

A modification of the structure illustrated in FIGURES 10 and 11 is shown in FIGURE 12 in which each of the plurality of rollers 141 is guided by opposing, radially spaced faces 140 of inturned lugs, or fingers, 143 integral with an outer rigid cage 144. Cage 144 is comparable to cage 55, except for the provision of the fingers 143 thereon which define the bearing receiving windows therein. The intermediate cage 22 and the inner cage 54 are provided with bearing receiving windows, as previously described, and of such nature as to clear both the bearings 141 and the lugs 143 as these cages 22 and 54 rotate relative to the outer cage 144.

A further modification of the FIGURE 10 structure is illustrated in FIGURES 13 and 14 in which rollers 145 are provided, comparable to rollers 141, except that the axially spaced sides are provided with indentations 146 as illustrated clearly in FIGURE 13. A resilient, intermediate cage $22^1$ is provided with a plurality of circumferentially spaced bearing receiving openings therein defined in part by edges $38^1$ and $39^1$, and further defined in part by inwardly directed projections 147 which are disposed within the indentations 146 in the ends of the rollers. The relationship between the projections 147 and the rollers 145 is of such nature that the rollers are free to rotate without any interference from the projections 147, which merely serve to guide the roller within the cage. As shown in FIGURE 14, the outer cage 19 and inner cage 54 are provided with suitable openings so that they do not jam against the rollers 145 as the sprags 14 go through their tilting range.

With respect to the clutches illustrated in FIGURES 10 through 14, the bearings are preferably preloaded by heating one of the races to effect its expansion, assembling that race with the subassembly—comprising the cages, sprags, bearings and the other race—and permitting the heated race to cool whereby it will contract to the desired dimension and preload the roller bearings.

In summarization, therefore, of this particular aspect of the invention, the clutches illustrated in FIGURES 1 through 8 and 10 through 14 are all of the full phasing type, comprising means maintaining substantially common angular relationship of the sprags, in which bearing means have been provided which constitute discrete elements in alignment with the sprags and which extend through, preferably without engagement, two of the three cages provided; it will be seen that such a full phasing clutch, having an integral bearing assembled therewith, is a distinct advantage in that the cost of manufacture of such an article is a substantial improvement over the cost of a full phasing clutch which requires separate bearings to be assembled therewith, and furthermore the width of the unit is materially reduced. As indicated earlier, the clutches illustrated in FIGURES 1 through 8 constitute the preferred embodiment. Furthermore, the particular construction of the cages illustrated herein is a feature of this invention by which the bearings may be readily assembled with the other elements of clutch in an economical and dependable manner.

While certain preferred embodiments of the invention have been specifically disclosed, it is understood that the invention is not limited thereto, as many variations will be readily apparent to those skilled in the art and the invention is to be given its broadest possible interpretation within the terms of the following claims:

We claim:

1. In a combined one-way sprag clutch and bearing for use between inner and outer races together providing radially inner and outer annular surfaces; the combination comprising a plurality of circumferentially spaced sprags adapted to tilt into and out of wedging engagement with the race surfaces; means adapted to effect substantially uniform tilting of said sprags throughout their normal degree of tilt whereby said sprags are maintained in phase with each other throughout their tilting range; and a plurality of circumferentially spaced roller bearing means disposed between the race surfaces in circumferential alignment with said sprags adapted to engage both the race surfaces simultaneously to maintain the concentricity thereof and the desired spacing therebetween.

2. In a combined one-way tiltable gripper clutch and bearing for use between inner and outer races providing radially spaced, annular surfaces; the combination comprising a plurality of circumferentially spaced tiltable grippers adapted to tilt into and out of wedging engagement with the race surfaces; a plurality of circumferentially spaced bearing means disposed between the race surfaces adapted to engage both the race surfaces simultaneously to maintain the concentricity of the races and the desired spacing therebetween; a plurality of radially spaced, relatively rotatable cages, means on said cages defining a plurality of circumferentially spaced, radially extending openings therethrough through which radially spaced portions of said grippers extend; said radially spaced portions of said grippers and said last-mentioned means being constructed and arranged to provide continuous contact therebetween during tilting movement of said grippers into and out of wedging engagement with the race surfaces whereby said grippers are maintained substantially in phase; a plurality of circumferentially spaced means on at least one of said cages respectively guiding said plurality of bearing means; and means defining bearing receiving openings in other of said cages including means spaced circumferentially to provide unrestricted rotative movement of said other of said cages relative to said one cage as said grippers tilt into and out of wedging engagement with the race surfaces; said circumferentially spaced bearing means comprising means having a circular cross section.

References Cited in the file of this patent

UNITED STATES PATENTS

| | | |
|---|---|---|
| 2,113,722 | Dodge | Apr. 12, 1938 |
| 2,268,376 | Dodge | Dec. 30, 1941 |
| 2,365,062 | Dodge | Dec. 12, 1944 |
| 2,366,842 | Dodge et al. | Jan. 9, 1945 |
| 2,750,019 | Ferris | June 12, 1956 |
| 2,795,308 | Hayden | June 11, 1957 |
| 2,824,636 | Troendly et al. | Feb. 25, 1958 |